United States Patent [19]

Gioutsos et al.

[11] Patent Number: 5,490,066
[45] Date of Patent: Feb. 6, 1996

[54] METHOD FOR DISCRIMINATING LONG-PERIOD, LOW-VELOCITY CRASHES

[75] Inventors: Tony Gioutsos, Brighton; Michael A. Piskie, Bloomfield Hills, both of Mich.

[73] Assignee: Automotive Systems Laboratory, Inc., Farmington Hills, Mich.

[21] Appl. No.: 874,431

[22] Filed: Apr. 27, 1992

[51] Int. Cl.$^6$ .................................................. B60R 21/32
[52] U.S. Cl. .................. 364/424.05; 340/436; 307/10.1; 280/735; 180/282
[58] Field of Search .................. 364/424.05, 426.01; 340/436, 438, 647; 280/735; 307/10.1; 180/282, 274

[56] References Cited

U.S. PATENT DOCUMENTS

| | | | |
|---|---|---|---|
| 4,967,866 | 11/1990 | Maehara | 364/426.01 |
| 4,968,965 | 11/1990 | Naitou et al. | 340/436 |
| 4,975,850 | 12/1990 | Diller | 364/424.05 |
| 5,021,678 | 6/1991 | Diller | 340/436 |
| 5,068,793 | 11/1991 | Condne et al. | 364/424.05 |
| 5,112,080 | 5/1992 | Okano | 340/436 |
| 5,173,614 | 12/1992 | Woehrl et al. | 307/10.1 |
| 5,309,138 | 5/1994 | Tohbaru | 340/436 |
| 5,337,238 | 8/1994 | Gioutsos et al. | 364/424.05 |
| 5,339,242 | 8/1994 | Reid et al. | 364/424.05 |
| 5,363,302 | 11/1994 | Allen et al. | 364/424.05 |

*Primary Examiner*—Kevin J. Teska
*Assistant Examiner*—Tyrone V. Walker
*Attorney, Agent, or Firm*—Lyman R. Lyon

[57] ABSTRACT

A vehicle crash discrimination method and system for controlling the actuation of a vehicle passenger restraint device (e.g., an air bag or a seat belt harness) comprises determining a vehicle velocity value and comparing it to a predetermined velocity threshold value. If the predetermined velocity threshold value is exceeded, the slope of vehicle acceleration with respect to time (i.e. jerk value) is determined and compared to a predetermined slope threshold value. The passenger restraint device is actuated if the predetermined slope threshold value is exceeded. The present method accurately discriminates between low-velocity crashes in which actuation of the passenger restraint device is not desired and low-velocity, long-time-period crashes in which actuation is desired by setting the velocity threshold equal to approximately half the velocity of a maximum allowable crash in which actuation of the passenger restraint device is not desired.

9 Claims, 1 Drawing Sheet

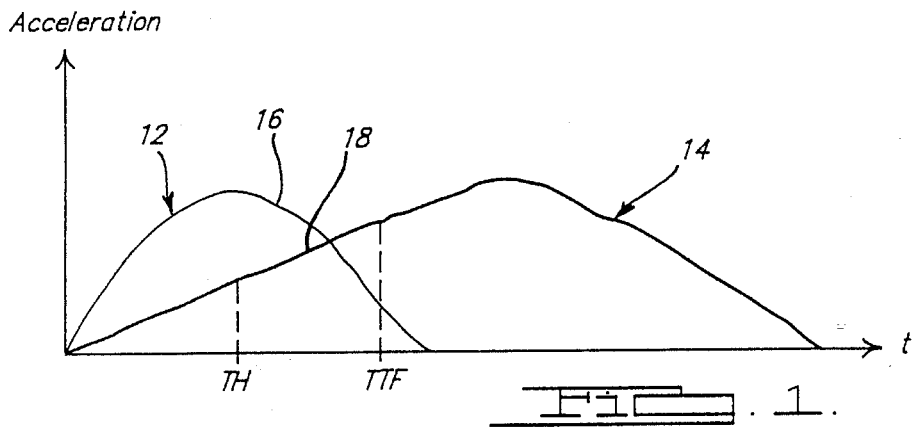
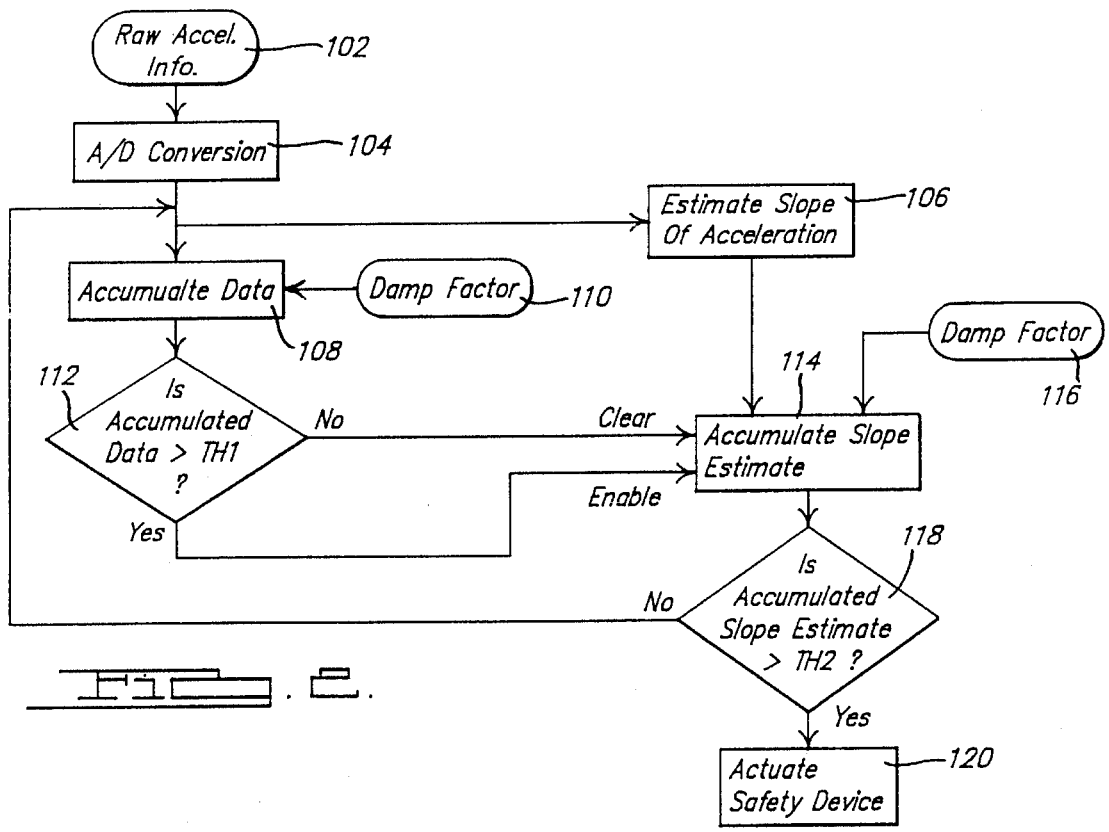
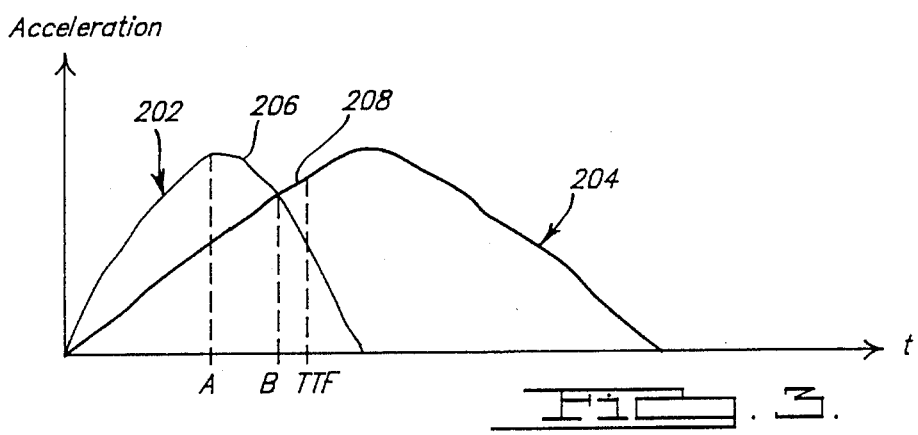

METHOD FOR DISCRIMINATING LONG-PERIOD, LOW-VELOCITY CRASHES

BACKGROUND OF THE INVENTION

The present invention generally relates to vehicle crash discrimination systems such as used to actuate a vehicle passenger restraint device (e.g. an air bag or seat belt harness), and more particularly to a method of discriminating vehicle crashes having low velocity and long time period characteristics.

A variety of systems for actuating vehicular safety devices are well known in the art. Such systems are used to sense a crash condition and, in response to such a condition, to actuate an air bag, lock a seat belt, or actuate a pretensioner for a seat belt retractor. Typically, the safety device is actuated or deployed into its protective position when an impact exceeding a predetermined magnitude is detected by the actuating system.

One prior art method for crash detection integrates the output of an electronic acceleration sensor over time and compares the result against a time-varying threshold velocity. A major drawback of this method is the wide "grey area" between "fire" and "no-fire" conditions for low-velocity crash conditions (i.e. "soft crashes") often results in an inadvertent deployment of the safety device when deployment is unnecessary, or nondeployment of the safety device when deployment is necessary. If a velocity threshold is established which will prevent a no-fire low-velocity crash pulse from causing actuation of the passenger restraint device, the velocity threshold will also prevent a low-velocity, long-time period crash pulse from causing actuation of the passenger restraint device. This presents an unacceptable and possibly hazardous crash discrimination technique.

SUMMARY OF THE INVENTION

It is therefore an object of the present invention to provide a method of crash discrimination, such as employed with controlling actuation of a vehicle passenger safety device, which is capable of discriminating low-velocity/long-time-period crashes from crash situations where safety device actuation is not desired (no-fire situations)

It is also an object of the present invention to provide a method of crash discrimination which utilizes both velocity information and a characterization of predicted velocity for discriminating low-velocity/long-time-period crashes from no-fire crash situations.

It is further an object of the present invention to provide a method of crash discrimination which utilizes a velocity threshold value as a control measure for a predicted velocity evaluation in discriminating serious crash situations from no-fire crash situations.

In accordance with the present invention, a method of vehicle crash discrimination for controlling actuation of a vehicle passenger restraint device comprises the steps of receiving vehicle acceleration information from at least one acceleration sensor; determining a value indicative of vehicle velocity based on the received vehicle acceleration information; and comparing the value indicative of vehicle velocity to a first predetermined threshold value. A value indicative of increasing or decreasing vehicle acceleration based on the received acceleration information with respect to time is also determined if the value indicative of vehicle velocity exceeds the first predetermined threshold value. The value indicative of increasing or decreasing vehicle acceleration is compared to a second predetermined threshold value having a positive value. The vehicle passenger restraint device is actuated if the value indicative of increasing or decreasing vehicle acceleration exceeds the second predetermined threshold value. The first predetermined threshold value is set equal to approximately half the velocity of a maximum allowable vehicle crash in which actuation of the vehicle passenger restraint device is not desired.

In further accordance with the present invention, a method of discriminating low-velocity, long-period vehicle crashes in which actuation of a vehicle passenger restraint device is desired from low-velocity vehicle crashes in which actuation of said vehicle passenger restraint device is not desired comprises the steps of receiving vehicle acceleration information from at least one acceleration sensor; determining a value indicative of vehicle velocity based on the received vehicle acceleration information; and comparing the value indicative of vehicle velocity to a first predetermined threshold value. A value indicative of increasing or decreasing vehicle acceleration based on the received acceleration information with respect to time is determined if the value indicative of vehicle velocity exceeds the first predetermined threshold value. The value indicative of increasing or decreasing vehicle acceleration is compared to a second predetermined threshold value having a positive value. The vehicle passenger restraint device is actuated if the value indicative of increasing or decreasing vehicle acceleration exceeds the second predetermined threshold value. The first predetermined threshold value is set equal to approximately half the velocity of a maximum allowable low-velocity vehicle crash in which actuation of the vehicle passenger restraint device is not desired.

The present invention will be more fully understood upon reading the following detailed description of the preferred embodiment in conjunction with the accompanying drawings.

BRIEF DESCRIPTION OF THE DRAWINGS

FIG. 1 is a graph of vehicle acceleration information versus time illustrating the prior art difficulty in discriminating low-velocity/long-time-period crash situations from no-fire crash situations;

FIG. 2 is an operational flow chart in accordance with the present invention; and FIG. 3 is a graph illustrating an example crash discrimination in accordance with the present invention.

DETAILED DESCRIPTION OF THE PREFERRED EMBODIMENT OF THE INVENTION

Referring to FIG. 1, there is shown a vehicle crash situation wherein the first haversine pulse 12 is representative of vehicle acceleration (deceleration) data versus time of a vehicle crash in which deployment of the safety device is not desired; and the second haversine pulse 14 is representative of vehicle deacceleration data versus time of a low-velocity, slowly developing (i.e., long-time period) vehicle crash in which deployment is desired. The required time-to-fire, or "TTF", is the pre-established velocity threshold value used for safety device deployment determination. Velocity is equal to the area under the respective curve. The required TTF shown is for the second pulse 14.

As shown in FIG. 1, the area under the first haversine pulse 12 (velocity) is significantly larger than the area under the second haversine pulse 14 up to the required TTF. However, the slope of pulse 12 indicates that the crash velocity is dissipating at the required TTF. In contrast, the slope of the pulse 14 is still increasing at the required TTF indicating velocity of the crash is continuing to increase in magnitude. If velocity is the sole criterion used in a crash discrimination method which is designed for deployment with low-velocity, long-period crashes, undesired actuation of the safety device would occur with pulse 12 (because the area under pulse 12 is greater than the area under pulse 14 up to TTF) even though pulse 12 is dissipating. Establishing a velocity threshold which will not allow the first pulse 12 to actuate the safety device would also prevent the second pulse 14 from actuating the safety device until after the required TTF.

The crash discrimination system of the present invention is able to distinguish between a no-fire crash pulse 12 and a low-velocity, long-time-period crash pulse 14 requiring deployment of the vehicle passenger restraint device. Once the velocity of a particular crash pulse has exceeded a first, lower velocity threshold TH, the instantaneous slope 16 or 18 (i.e. the jerk of the velocity) of the particular crash pulse 12 or 14, respectively, is monitored for detection of increasing velocity prior to the required TTF. The calculation of the slope (jerk) value provides a reliable characterization of predicted velocity. If the slope exceeds a predetermined positive threshold value, the vehicle passenger restraint/safety device is actuated.

Referring now to FIG. 2, there is shown an operational flow chart in accordance with the present invention. Raw acceleration information generated by one or more conventional acceleration sensors (accelerometers) is received and input into an analog to digital (A/D) conversion process 104 for digitizing the raw acceleration information. A filtering process (not shown) can be utilized prior to A/D conversion. The digitized acceleration data is then processed to calculate the velocity and to estimate the slope of acceleration data versus time (jerk value) 106.

The calculation of velocity entails accumulating the digitized acceleration data at step 108 into sample points (representative of discrete points along the haversine pulse) such as by a suitable integrator circuit. In the preferred embodiment, a first damping factor 110 is summed with the digitized acceleration data prior to accumulation 108 of the data. Such damping is taught in copending patent application entitled, "Fully-Damped Crash Discriminator," Ser. No. 07/773,676, filed Oct. 8, 1991, incorporated by reference herein. The damping factor 110 may be a constant, e.g., equal to a nominal acceleration an average vehicle passenger could himself resist without the aid of a passenger safety restraint. However, the damping factor 110 is most preferably a function of the data being damped (i.e. the acceleration, velocity, or jerk). This allows significant acceleration data to be stored for a longer period of time, thereby increasing discriminator responsiveness.

After the damped, digitized acceleration data has been accumulated i.e. the velocity calculated, the accumulated data is compared at step 112 to a predetermined velocity threshold value TH1. Comparison step 112 acts as a control for a slope estimate accumulation process 114. If the accumulated data exceeds the first velocity threshold TH1, slope estimate accumulation 114 is enabled. If the velocity threshold TH1 is not exceeded, slope estimate accumulation 114 is reset and/or the accumulation results are cleared.

Once enabled, the slope estimate accumulation 114 sums together the separate acceleration data slope estimates generated by slope estimation process 106. A second damping factor 116, which is established in a manner similar to the first damping factor 110 described hereinabove, is also summed with the acceleration data slope estimates to generate an overall jerk value for the acceleration data. The accumulated jerk value is then compared at step 118 with a second jerk (slope) threshold value TH2. If the accumulated jerk value exceeds the slope threshold value TH2, the passenger restraint device is actuated as indicated at step 120. If the accumulated jerk value does not exceed the slope threshold value TH2, the discrimination process returns to generate the next accumulated sample point for comparison to the first threshold TH1.

In accordance with the present invention, the above described crash discrimination method is particularly suited for discrimination of low-velocity, long-period crashes in which vehicle safety device actuation is desired from low-velocity crashes in which deployment is not desired. This discrimination of low-velocity crashes is particularly achieved with the present invention by establishing a velocity threshold TH1 which is approximately equal to half the velocity of a maximum-allowable low-velocity crash without actuating the vehicle safety device. The exceeding of the velocity threshold TH1 is then utilized to control the monitoring of the slope (jerk) of the vehicle acceleration.

An example illustrating discrimination of a low-velocity, long-period crash in accordance with the present invention is shown in FIG. 3. FIG. 3 shows a first crash pulse 202 representative of a low-velocity crash pulse having a velocity of 8 mph and a duration of 100 milliseconds in response to which actuation is not desired; and a second crash pulse 204 representative of a low-velocity, long-period crash pulse having a velocity of 16 mph and a duration of 200 milliseconds in response to which actuation is desired. A velocity threshold value TH1 is established at 4 mph to correspond with approximately half the velocity of the first crash pulse 202.

At point A, the velocity of first crash pulse 202 will have exceeded the velocity threshold value TH1, thereby triggering the monitoring of the slope portion 206 of first crash pulse 202. The slope threshold value TH2 would preferably be set to a small, positive value. Since first crash pulse 202 is diminishing in velocity after point A, the accumulative slope 206 will be a negative value. Actuation of the vehicle passenger restraint device will not occur if slope threshold value TH2 is not exceeded during the monitoring period.

At point B, the velocity of second crash pulse 204 will also have exceeded the velocity threshold value of TH1 of 4 mph. However, pulse 204 is still increasing in velocity after point B. Thus, the slope 208 of second crash pulse 204 will exceed the slope threshold value TH2, thereby causing actuation of the passenger restraint device at the "time-to-fire" point TTF.

The method of the present invention is particularly applicable as a second level of vehicle crash discrimination utilized in a main vehicle crash discrimination system such as taught in the above mentioned copending patent application, Ser. No. 07/773,676. In accordance with this aspect, the A/D conversion 104 and the slope estimation 106 steps can be performed within the main vehicle crash discrimination system. To alleviate redundancy, the results of these steps would then be supplied to the present invention for utilization therein. A second level of crash discrimination in accordance with the present invention assures actuation of the vehicle safety device for critical low-velocity, long-period crash situations.

However, it is noted the method of present invention is equally applicable as a stand alone method of crash discrimination. For example, in analyzing FIG. 3, a crash pulse having a velocity of 25 mph and a duration 100 milliseconds will cause actuation of the passenger restraint device, while a crash pulse having a velocity of 8 mph and a duration of 200 milliseconds will not cause actuation of the passenger restraint device.

It will be understood that the foregoing description of the preferred embodiment of the present invention is for illustrative purposes only, and that the various structural and operational features herein disclosed are susceptible to a number of modifications and changes, none of which departs from the spirit and scope of the present invention as defined in the appended claims.

We claim:

1. A method of vehicle crash discrimination for controlling actuation of a vehicle passenger restraint device comprising the steps of:

receiving vehicle acceleration information from at least one acceleration sensor;

determining a value indicative of vehicle velocity based on said received vehicle acceleration information;

comparing said value indicative of vehicle velocity to a first predetermined threshold value;

determining a value indicative of increasing or decreasing vehicle acceleration based on said received acceleration information with respect to time if said value indicative of vehicle velocity exceeds said first predetermined threshold value;

comparing said value indicative of increasing or decreasing vehicle acceleration to a second predetermined threshold value, said second predetermined threshold value being a positive value; and actuating said vehicle passenger restraint device if said value indicative of increasing or decreasing vehicle acceleration exceeds said second predetermined threshold value, wherein said first predetermined threshold value is equal to approximately half the velocity of a maximum allowable vehicle crash in which actuation of said vehicle passenger restraint device is not desired.

2. The method of claim 1 wherein said acceleration information is respectively damped before determining said value indicative of vehicle velocity and said value indicative of increasing or decreasing vehicle acceleration.

3. The method of claim 1 wherein said value indicative of increasing or decreasing acceleration comprises a jerk value of the acceleration information.

4. A method of discriminating low-velocity, long-period vehicle crashes in which actuation of a vehicle passenger restraint device is desired from low-velocity vehicle crashes in which actuation of said vehicle passenger restraint device is not desired, said method comprising the steps of:

receiving vehicle acceleration information from at least one acceleration sensor;

determining a value indicative of vehicle velocity based on said received vehicle acceleration information;

comparing said value indicative of vehicle velocity to a first predetermined threshold value;

determining a value indicative of increasing or decreasing vehicle acceleration based on said received acceleration information with respect to time if said value indicative of vehicle velocity exceeds said first predetermined threshold value;

comparing said value indicative of increasing or decreasing vehicle acceleration to a second predetermined threshold value, said second predetermined threshold value being a positive value; and actuating said vehicle passenger restraint device if said value indicative of increasing or decreasing vehicle acceleration exceeds said second predetermined threshold value, wherein said first predetermined threshold value is equal to approximately half the velocity of a maximum allowable low-velocity vehicle crash in which actuation of said vehicle passenger restraint device is not desired.

5. The method of claim 4 wherein said acceleration information is respectively damped before determining said value indicative of vehicle velocity and said value indicative of increasing or decreasing vehicle acceleration.

6. The method of claim 4 wherein said value indicative of increasing or decreasing acceleration comprises a jerk value of the acceleration information.

7. A vehicle crash discrimination system for controlling actuation of a vehicle passenger restraint device comprising:

means for receiving vehicle acceleration information from an acceleration sensor;

means for determining a value indicative of vehicle velocity based on said received vehicle acceleration information;

first comparing means for comparing said value indicative of vehicle velocity to a first predetermined threshold value;

means connected to said receiving means for determining a value indicative of increasing or decreasing vehicle acceleration based on said received acceleration information with respect to time if said value indicative of vehicle velocity exceeds said first predetermined threshold value;

second comparing means for comparing said value indicative of increasing or decreasing vehicle acceleration to a second predetermined threshold value, said second predetermined threshold value being a positive value; and means connected to said second comparing means for actuating said vehicle passenger restraint device if said value indicative of increasing or decreasing vehicle acceleration exceeds said second predetermined threshold value, wherein said first predetermined threshold value is equal to approximately half the velocity of a maximum allowable vehicle crash in which actuation of said vehicle passenger restraint device is not desired.

8. The system of claim 7 further comprising a first damping means connected to said vehicle velocity determining means for damping said received acceleration information, and a second damping means connected to said increasing or decreasing acceleration determining means for damping said value indicative of increasing or decreasing vehicle acceleration.

9. The system of claim 7 wherein said value indicative of increasing or decreasing acceleration comprises a jerk value of the acceleration information.

* * * * *